United States Patent [19]

Sample

[11] 3,967,312
[45] June 29, 1976

[54] COLOR TELEVISION CHROMA DEMODULATOR CIRCUIT

[75] Inventor: Lawrence Ray Sample, Huntington Beach, Calif.

[73] Assignee: Motorola, Inc., Chicago, Ill.

[22] Filed: Nov. 18, 1974

[21] Appl. No.: 524,425

[52] U.S. Cl. .................................................. 358/23
[51] Int. Cl.² .......................................... H04N 9/50
[58] Field of Search ...................................... 358/23

[56] References Cited
UNITED STATES PATENTS

| | | | |
|---|---|---|---|
| 3,513,256 | 5/1970 | Bilotti | 358/23 |
| 3,595,989 | 7/1971 | Hoke, Jr. | 358/23 X |
| 3,624,275 | 11/1971 | Lunn | 358/23 |

*Primary Examiner*—Robert L. Griffin
*Assistant Examiner*—Mitchell Saffian
*Attorney, Agent, or Firm*—Michael D. Bingham; Harry M. Weiss

[57] ABSTRACT

A silicon monolithic integrated circuit comprising a DC biasing network and three sets of full wave, synchronous, gated, transistor demodulators to demodulate the red, blue and green color different signals which are present in a composite television signal. The DC biasing network includes; a voltage regulator for providing a direct current voltage independent of variations in the magnitude of a power supply voltage the variations may be caused by voltage transients or varients in the temperature of the monolithic chip, and a direct current bias amplifier connected to the voltage regulator for providing a zero differential temperature coefficient direct current bias voltage to the outputs of the three sets of demodulators. Also disclosed is a blanking amplifier to facilitate direct current restoring at each of the outputs of the demodulators, the blanking amplifier being responsive to a blanking input signal. As a result, variations in the direct current voltage level at the output of the demodulators are severely attenuated. Moreover, a background adjust which is suitable for use with new unitized gun cathode ray tubes is disclosed whereby the TV manufacturer is allowed to perform the background adjustment or gray scale tracking adjustment. Furthermore, the chroma demodulator circuit includes three sets of demodulators for direct demodulating of the three color signals in place of a matrix for demodulation of the green difference signal.

14 Claims, 2 Drawing Figures

COLOR TELEVISION CHROMA DEMODULATOR CIRCUIT

CROSS REFERENCE TO A RELATED PATENT

The subject matter of the subject invention is related to the subject matter of U.S. Pat. No. 3,840,697, entitled "A Color Television Demodulator Signal Demodulation System", by Gerald K. Lunn, issued Oct. 8, 1974 and which is assigned to Motorola, Inc.

BACKGROUND OF THE INVENTION

In the manufacture of electronic devices such as television receivers, it is desirable to utilize solid state components to the greatest extent possible in order to realize the advantages inherent in such components.

One of the circuits in the color television circuit requiring a relatively large number of components is the chroma demodulator section of the receiver. This portion of the television receiver is used to separate the color difference signals present in the NTSC color television signal. This signal includes a wideband brightness luminance (Y) signal, and a modulated subcarrier signal of approximately 3.58 megahertz. The subcarrier signal is phase and amplitude modulated by color difference signals (R - Y, B - Y and G - Y), so that different phases of the subcarrier each represent the hue of an image portion and the subcarrier amplitude at that phase represents the saturation of the hues. A monochrome receiver visibly reproduces only the white component.

In prior art color television receivers there are several basic problems associated with the use of integrated circuit chroma demodulators. The first problem generic to the use of the integrated circuit chorma demodulators in prior art is that only two demodulators are used. One is used to demodulate the R - Y and the other to demodulate the B - Y color difference signal. A matrix is used to obtain the G - Y signal. Because the matrix is fixed within the prior art integrated circuits, it cannot be varied to meet the needs of different color picture tubes. More specifically, the gain and phase angle associated with the green color signal output is fixed. Thus, as the phosphorus, for visually displaying a color, changes in the color picture tube a different phase angle is required, therefore, the prior art integrated circuit has to be modified to meet the demands of every new picture tube.

Another problem relating to prior art integrated circuit demodulators is that the output direct current (DC) voltage level is not well defined. The voltage level varies with the supply voltage and with temperature. This is undesirable because a small voltage change at the output of the demodulator is amplified and would result in large changes at the cathode of the color picture tube. If this voltage change is a straight DC level shift a brightness variation would be viewed at the picture tube. If it is a differential shift, a change in tint would be evident. For example, the red cathode ray gun might change while the blue and green guns remain constant. This would then result in a redish tint to the picture. A differential change means a relative change between the three outputs.

A further problem with prior art integrated circuit demodulators relates to background adjust of the new unitized gun cathode ray tubes which are now used for color television sets. In the past the color picture tube structure had separate screen grids which allowed the television manufacture to perform the background adjustment or the gray scale tracking adjustment at the screen grids of the color picture tube. However, the new unitized gun structure has the screen grids tied together so that the background adjustment can no longer be made at the color picture tube. Therefore, the background adjustment must be done at some other point, which is made difficult by present integrated circuit demodulators because their DC output levels are fixed and cannot be varied.

A still further problem created by prior art integrated circuit demodulators relates to the difficulty with which their outputs can be DC restored in the video output portion of the color television receiver. Direct current (DC) restoring is that function by which the DC offsets, which might be present in the demodulator and video output, are removed by clamping each of the three outputs, red, blue and green, to the same DC level at the cathode of the color picture tube. This function requires that a well defined pulse be present in each of the three outputs from the integrated circuit demodulators so that the pulse may be clamped to define the DC level in the video output stage. Prior art integrated circuit demodulators do not provide such a pulse, making it very difficult for them to be DC restored in this fashion.

A need exists to develop a solution to the problems associated with prior art integrated circuit demodulators caused by direct current voltage level changes, matrixing of the chromiance signal and to changes in the phosphorus material of the color picture tube. Moreover, some prior art demodulator configurations are not flexible enough to be used with a unitized color picture tube.

SUMMARY OF THE INVENTION

Accordingly, one object of this invention is to provide an improved chroma demodulator circuit.

Another object of this invention is to provide a demodulator circuit which provides independent adjustment of the gains and phase angles of the color difference signals.

Still another object of the invention is to provide a chroma demodulator circuit having output DC stability wherein the absolute voltage at the output terminals of the demodulators remains stable with changes in supply voltages and changes in temperature.

A further object is to provide a chroma demodulator circuit having improved stability wherein the differential voltage is between the output terminals of the chroma demodulator remains constant with changes in supply voltages and with changes in the ambient temperature.

A still further object of the ivention is to provide a chroma demodulator circuit wherein the direct current levels at the output terminals of the chroma demodulators are independently adjustable.

An additional object of the invention is to provide a chroma demodulator circuit wherein identical blanking reference pulses are available at each of the three demodulator output terminals to facilitate DC restoring at the Video output stage.

A still additional object of the invention is to provide a circuit configuration for an integrated circuit chroma demodulator having a DC brightness control terminal to facilitate simultaneous control of the three DC output levels appearing at the output terminals of the demodulator.

The chroma demodulator circuit configuration and method of demodulation of the invention are suitable for providing red, blue, and green color difference signals in a color television receiver in response to the NTSC color television signal and modulated subcarrier signal. Moreover, the chroma demodulator circuit provides DC stability at the output of the three demodulators. The chroma demodulator circuit includes a DC biasing network and three sets of color demodulators. The DC biasing network has input terminals to which the power supply voltage, a brightness control signal and the blanking input signal are applied and output terminals at which a zero differential temperature coefficient direct current biased voltage is developed. The demodulator circuit has input terminals to which the chromiance signal and modulated subcarrier signal are applied and output terminals at which the color difference signals are developed. The DC bias network includes first and second portions, the first portion comprising a voltage regulator circuit for receiving the power supply voltage and developing the direct current bias voltage which is independent from variations in the magnitude of the power supply voltage and temperature changes. The second portion includes a bias amplifier, a blanking amplifier, and a brightness amplifier. The DC bias amplifier includes an input terminal connected to the voltage regulator for developing the zero differential temperature coefficient direct current bias voltage at output terminals thereof and also input terminals connected to the brightness amplifier and the blanking amplifier. In response to a blanking signal applied to the input of the blanking amplifier, the DC bias amplifier develops identical reference pulses to facilitate direct current restoring at each of the outputs of the demodulator circuits, and in response to a background adjustment signal being supplied to the brightness amplifier the DC bias amplifier develops an equal magnitude signal at the output of the demodulator circuits for providing a signal to the cathodes of the color cathode ray guns of the color picture tube. Further objects and advantages of the invention will become apparent as the description proceeds.

DETAILED DESCRIPTION OF THE PREFERRED EMBODIMENT

Figure 1:
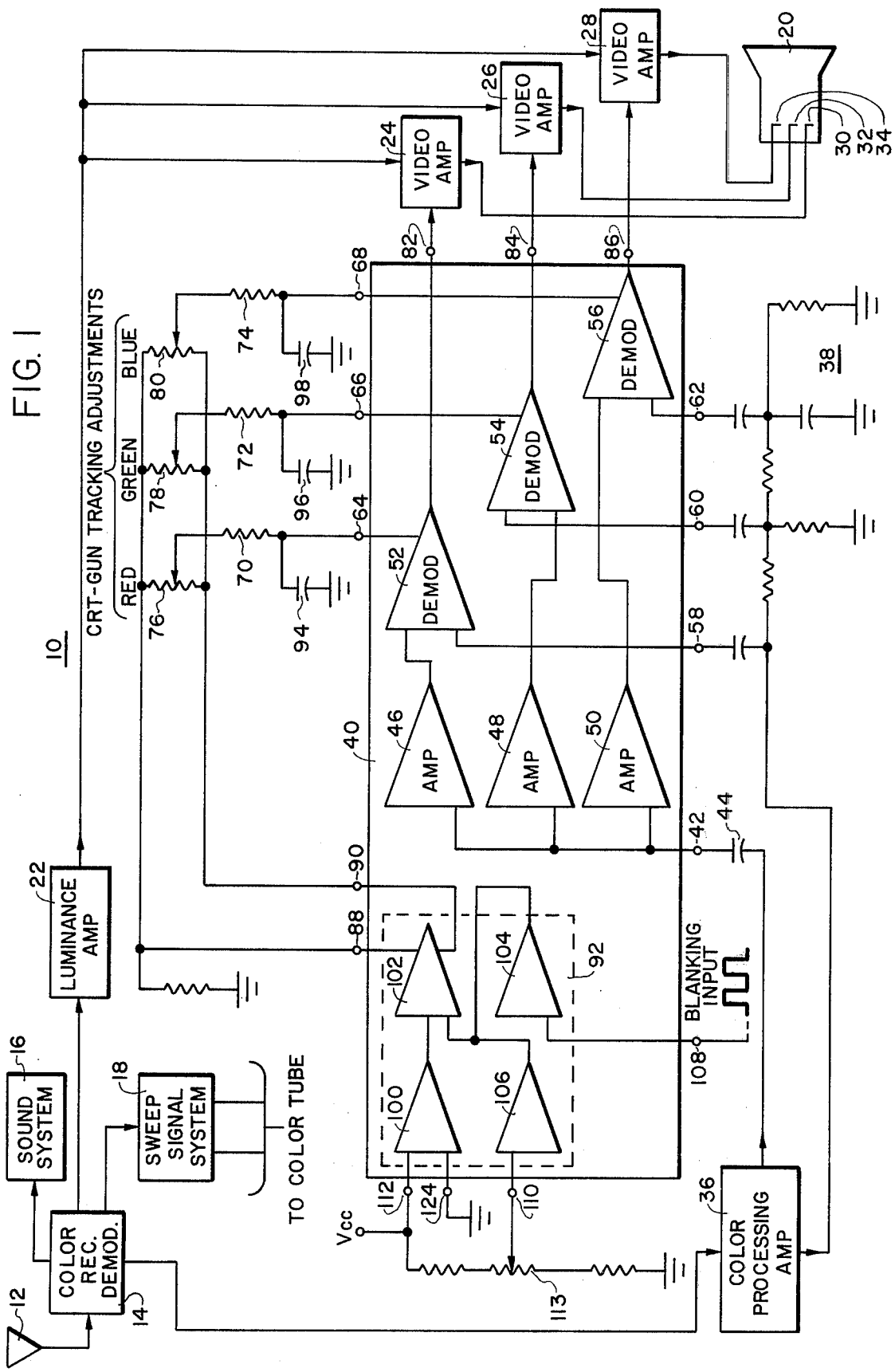
FIG. 1 is a block diagram of a color television receiver including a chroma demodulator circuit of the embodiment of the invention shown in block diagram form.

A color television receiver will first be described. Referring to FIG. 1, a color television receiver 10 is coupled to a suitable antenna 12 to receive a composite signal that has been transmitted. The composite signal received by antenna 12 is applied to color receiver demodulator 14 and is demodulated. The audio portion of the received signal is directed to sound system 16 which demodulates and amplifies the usual 4.5 megahertz sound subcarrier to drive a speaker (not shown). The horizontal and vertical beam synchronizing pulses of the composite signal are received by sweep signal system 18 from demodulator 14 and are coupled to the deflection yoke of the three beam color cathode ray tube 20. Sweep signal system 18 also provides a high voltage output for the screen of the cathode ray tube 20. A luminance signal separated from the composite signal by color receiver demodulator 14 is supplied to luminance amplifier 22, amplified and supplied to the three color video amplifiers 24, 26 and 28 which drive the three cathode ray guns 30, 32 and 34 for developing the red, green and blue colors to be presented by color picture tube 20. Color processing amplifier 36 which is connected to color receiver demodulator 14 develops a chrominance signal containing the chrominance information and also a regenerated 3.58 megahertz reference signal.

The 3.58 megahertz reference signal is regenerated from burst signals contained in the composite signal for synchronous demodulation of the color signal, the reference signal having the same phase as the burst. The reference signal is then applied to the phase shift circuit 38 which provides reference phases for chroma demodulator chip 40.

The chrominance signal from color processing amplifier 36 is supplied to color demodulator chip 40 through capacitor 44. The chrominance signal is then supplied to chroma amplifiers 46, 48 and 50 with respective outputs connected to R - Y, G - Y, and B - Y demodulators 52, 54 and 56 at respective input terminals. The 3.58 megahertz reference signal, having had its phase shifted to the correct value, is applied to demodulators 52, 54 and 56 at respective input terminals through pins 58, 60 and 62 of IC demodulator chip 40.

The output of R - Y demodulator 52, G - Y demodulator 54 and B - Y demodulator 56 contains a color difference signal modulated on a direct current voltage component. The level of the DC component on which the color difference signals are modulated from the demodulators is determined by the voltage level applied at pins 64, 66 and 68 respectively. The gain of the separate color demodulators 52, 54 and 56 is controlled by the values of the separate load resistors 70, 72 and 74. The direct current (DC) component applied to pins 64, 66 and 68 is determined by the value of potentiometers 76, 78 and 80. Because the demodulators 52, 54 and 56 are arranged so that the currents in load resistors 70, 72 and 74 are zero when no signal is present, the voltage levels of potentiometers 76, 78 and 80 supply separate and independent voltages to pins 64, 66 and 68. When there is no signal, present, the voltage levels at the arms of the potentiometers are translated directly to pins 82, 84 and 86. The magnitude of the voltage on pins 82, 84, and 86 may be shifted down one diode with respect to the magnitude of the voltage on the wiper arms. The voltage magnitudes at pins 82, 84 and 86 are supplied to amplifiers 24, 26 and 28 together with the luminance signal (Y) from amplifier 22 which provides the direct current and alternating current components necessary to produce the red, green and blue color signals for cathode ray guns 30, 32 and 34 of color picture tube 20.

In order that the picture tube provide a constant white color, the voltage magnitudes appearing on pins 82, 84 and 86 of demodulator chip 40 must be constant, even though the power supply voltage or the temperature of the monolithic chip changes. To insure that the above voltage levels are relatively constant, the voltage supplied to the potentiometers 76, 78 and 80 at output terminals 88 and 90 of chroma demodulator chip 40 are made to have a zero differential temperature coefficient due to DC biasing network 92, as will be explained later in the description.

The values of resistor 70, 72 and 74 connected to the three demodulators 52, 54 and 56 are different with respect to each other. The reason that the values are different is that the gains of the individual demodulators are required to be different by the make up of the chrominance signal. More particularly, a greater output voltage for a given input color subcarrier level is required from the B - Y demodulator than from either the G - Y or the R - Y demodulator 54 and 56 respectively. Consequently, resistor 74 of B - Y demodulator 56 is greater in value than either resistor 70 or 72 of the G - Y and the R - Y demodulator. The lowest value of color difference signal required to provide the direct red, green, and blue signals at cathode gun 30, 32 and 34 is derived from the G - Y demodulator, wherein resistor 72 is the least value of all three resistor values.

In many cases due to the fact that the picture tube does not have the standard phosphorus required by the NTSC signal it has become standard practice to change the gains of color demodulators 52, 54 and 56 to provide the most realistic looking pictures, that is the voltages developed at cathode ray guns 30, 32 and 34 may not be exactly as required in the NTSC signal but are modified to compensate for errors in the phosphorus characteristics. The ability to change the gain of demodulators 52, 54 and 56 to match the phosphorus characteristics is provided for the monolithic demodulator by providing that the gain controlling resistors are external to the chip. In prior art demodulator circuits this gain was fixed by the internal matrix used to derive the G - Y color difference signal. In addition to providing an external gain control to the monolithic chip, the bandwidth characteristics of the demodulators are also controlled external to the chip by providing capacitors 94, 96 and 98 which are connected to the outputs of the R - Y, B - Y and G - Y modulators 52, 54 and 56 respectively. By choosing the values of the capacitors properly, the bandwidth of the monolithic integrated circuit demodulator chip 40 can be chosen to provide the desired operating characteristics.

The three color difference signals appearing at pins 82, 84 and 86 are supplied to video amps 24, 26 and 28 respectively. The brightness signal of luminous signal supplied from luminance amplifier 22 to the video amplifiers 24, 26 and 28 is combined with the appropriate color difference signal to provide the color signals red, green and blue at cathode ray guns 30, 32 and 34.

Direct current (DC) bias network 92 is provided with two control input terminals 108 and 110 respectively. DC bias network 92 comprises voltage regulator 100, DC bias amplifier 102, blanking amplifier 104, and brightness amplifier 106. Voltage regulator 100 has its input connected at pin 112 to a positive power supply and its output is coupled to one input terminal of DC bias amplifier 102. A second input terminal of DC bias amplifier 102 is adapted to be connected to the outputs of blanking amplifier 104 and brightness amplifier 106 respectively. The input of blanking amplifier 104 is adapted to be connected to pin 108 of demodulator chip 40 for receiving a blanking input signal, the brightness amplifier 106 has an input terminal that is adapted to be connected to pin 110 of demodulator chip 40 and is controlled by the direct current voltage derived across potentiometer 113.

To control the brightness signal from DC bias network 92 potentiometer 113 is adjusted which changes the voltage level applied by brightness amplifier 106 to DC bias amplifier 102. In response to adjusting potentiometer 113, the voltage level at pins 88 and 90 changes which in turn causes the voltage potential across tracking potentiometers 76, 78 and 80 to change in such a way that the voltage at pins 82, 84 and 86 are varied in direct response to the position of the potentiometer arm of potentiometer 113. The result of this is to change the voltage level on video amplifiers 24, 26 and 28 to directly control the brightness of the color picture tube 20. Because the voltage change is made on both ends of potentiometers 76, 78 and 80 correct tracking of the black and white color picture chrominance is insured. In other words, the black and white color signal stays with the proper color temperature.

Blanking amplifier 104 is provided for providing a control signal to reduce the brightness level during horizontal and vertical retrace intervals for horizontal and vertical blanking. A blanking input signal applied to the input of blanking amplifier 104 renders blanking amplifier 104 conductive which pulls the input level of DC bias amplifier 102 to a low level and therefore reduces the voltage at pins 88 and 90. Hence, the voltage level to video amplifiers 24, 26 and 28 is reduced during retracing of both the horizontal and vertical scanning beams for turning cathode ray guns 30, 32 and 34 off during the retrace cycle.

Figure 2:
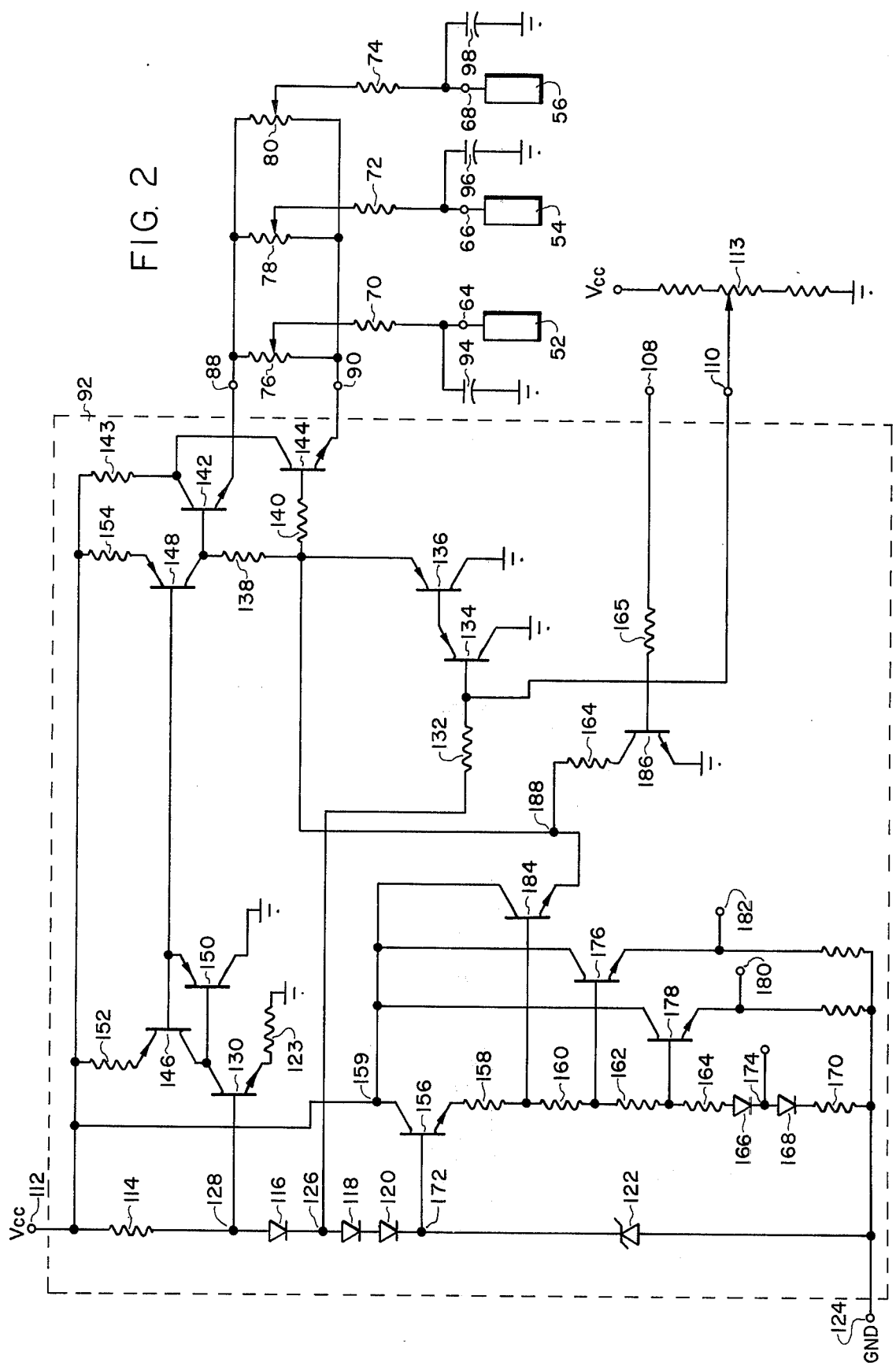
FIG. 2 is a schematic diagram illustrating a chroma demodulator circuit of the embodiment of the invention.

DC biasing network 92 of the embodiment of the invention is illustrated in greater detail in FIG. 2. DC bias network 92 comprises voltage regulator 100, DC bias amplifier 102, blanking amplifier 104 and brightness amplifier 106. A positive power supply signal is supplied at reference terminal $V_{CC}$ to voltage regulator 100 at terminal 112. The supply voltage is coupled through resistor 114 to series connected diodes 116, 118 and 120 and zener diode 122 which has its anode electrode connected to circuit reference terminal 124; the series components comprising the basic voltage regulator. The above combination acts as a shunt regulator to provide voltages at terminals 126 and 128 that are independent of the supply voltage. Furthermore, the voltage appearing at terminal 126 is independent of temperature, because the negative temperature coefficients of diodes 118 and 120 cancel the positive temperature coefficient of zener diode 122. Moreover, the voltage at the emitter of transistor 130 is also constant with temperature, the base of transistor 130 being connected to terminal 128.

The basic DC path for the DC voltage, which is supplied to the three chroma demodulators 52, 54 and 56, is from terminal 126 through resistor 132 to the base of transistor 134. Transistor 134 and 136 comprise a Darlington emitter follower stage with its DC output being coupled through resistors 138 and 140 to the bases of transistors 142 and 144 respectively. The voltage at emitter of device 144 is $1V_{BE}$ drop below the voltage at the emitter of transistor 136. Hence, since this voltage is still one diode drop above the zero temperature coefficient voltage point, the voltage at the emitter has a negative temperature coefficient. This is required to compensate for the temperature coefficient of the emitter followers at the outputs of demodulators 52, 54 and 56. Therefore, the absolute voltage at the output of the three demodulators has a zero temperature coefficient. A second reference voltage is provided at emitter of transistor 142. This voltage is level shifted positive to the voltage at the emitter of device 144 by the current flowing in resistor 138. The current through resistor 138 is delivered from the PNP turn-around circuit comprised of transistors 146, 148 and 150 and resistors 152 and 154 in a manner which is well known to those skilled in the art. Resistors 152 and 154 are connected between the power supply voltage and the emitters of transistors 146 and 148. The emitter of transistor 150 is commonly connected to the bases of transistors 146 and 148 and has its collector electrode connected to circuit reference terminal. The output terminal of the PNP turn-around circuit to which the current is supplied to resistor 138 is taken at the collector of transistor 148. Because the PNP turn-around circuit is driven from collector 130 which has a zero temperature coefficient voltage at its emitter, the voltage drop across resistor 138 also has a zero temperature coefficient. Therefore, voltages are developed at the emitters of transistors 142 and 144 which have an absolute temperature coefficient to compensate for the output emitter followers of the three chroma demodulators 52, 54 and 56, but which have a zero differential temperature coefficient at output terminals 88 and 90. Because the voltages appearing across terminals 88 and 90 have a zero differential temperature coefficient, potentiometers 76, 78 and 80, which are connected to these output terminals, provide independently adjustable zero temperature coefficient DC voltages to the outputs of the three chroma demodulators. Resistor 140 is placed in the base circuit of transistor 144 to insure that the voltage drop between emitters of transistors 142 and 144 is held constant. The base current of device 142 causes a slight voltage drop across resistor 138. Therefore, resistor 140 is added so that the same voltage drop occurs across it due to the base current of device 144. Thus, the voltage across the emitters of transistors 142 and 144 remains constant. The aforementioned voltages appearing across the potentiometers 76, 78 and 80, allow background adjustments to be made to control the colorimetry of the television image produced. This is a distinct advantage of the present integrated circuit demodulator over prior art circuits as demodulate chip 40 may be used with unitized cathode ray tubes now available in the television market.

The brightness of the demodulator circuit is controlled through the use of potentiometer 113 which is connected between the positive power supply at pin 112 and circuit reference terminal 124. The brightness voltage is connected to pin 110 by the variable arm of potentiometer 113, with pin 110 being connected to the base of device 134 of the Darlington emitter follower. When the brightness control pin 110 is left open, the voltages at the outputs of the three chroma demodulators 52, 54 and 56 are at a voltage level defined by zener diode 122, and diodes 120 and 118 respectively. However, if the voltage appearing at pin 110 is varied by using the external potentiometer 113, the three output DC levels of the demodulator circuits are simultaneously varied, either positive or negative about the original DC value.

A zero temperature coefficient current source reference providing a reference current for the three demodulators 52, 54, and 56 comprising transistor 156, which is emitter coupled through resistors 158, 160, 162, and 170 and diodes 166 and 168 to reference terminal 124 is also shown in FIG. 2. The collector of transistor 156 is directly connected to the supply voltage and its base is connected to terminal 172 at the cathode of zener diode 122. The voltage at the emitter of transistor 156 has a positive temperature coefficient and the voltage across diodes 166 and 168 has a negative temperature coefficient, which results in a large positive temperature coefficient voltage across resistors 158, 160, 162 and 170 that provides for the current flowing through transistor 156 and diodes 166 and 168 to be largely independent of temperature. Output terminal 174 at the junction between diodes 166 and 168 is adapted to be connected to the three demodulators for providing a reference voltage for the current sources used in the demodulator circuits. A zero temperature coefficient current for the demodulators is thus provided to allow tracking with load resistors 70, 72, and 74 of the demodulators, which are external and therefore do not change with temperature changes on the integrated circuit. Transistors 176 and 178 provide bias voltages required in the three demodulators 52, 54, and 56 at output terminals 182 and 180 respectively. Transistor 176 has its base connected between the junction of resistors 160 and 162 and its collector directly connected to the power supply voltage. The emitter of transistor 176 is coupled to reference terminal 182. Transistor 178 has its base electrode connected to the junction between resistor 162 and 164, its collector connected to the power supply voltage, and its emitter coupled to reference terminal 180. The above circuit configuration, including transistors 156, 176, and 178, provides common DC biasing to allow the use of three chroma demodulators 52, 54, and 56 with external variable load resistors 76, 78, and 80.

Blanking amplifier 104, comprised of transistors 184 and 186 provides the blanking function for the chroma demodulator circuit. Transistor 184 has its base electrode connected between the junction of resistors 158 and 160, its collector electrode connected to the power supply voltage and its emitter electrode connected to terminal 188 which provides an input to DC bias amplifier 102. Transistor 186 has its collector electrode coupled to the emitter electrode of transistor 184, its emitter electrode connected to the reference terminal 124, and its base electrode is coupled to pin 108 of the demodulator circuit.

In operation, the blanking amplifier functions in the following manner. Normally the voltage at pin 108 is at a low potential, rendering 186 nonconductive, which allows voltage regulator 100 and DC bias amplifier 102 to operate as previously described. In response to a blanking input signal, the voltage at pin 108 is taken positive, which renders transistor 186 conductive. As transistor 186 conducts, the voltage level at the emitter of transistor 136 of the Darlington emitter follower is level shifted to a lower voltage defined by the voltage at the emitter of transistor 184. The output voltages of the demodulators 52, 54, and 56 are thus shifted to a negative value. Hence, the color picture tube 20 will be blanked during the duration of the blanking input signal. The blanking pulse developed at the output of each of the chroma demodulators is insured of being identical in amplitude due to the continued conduction of transistor 148. Since transistor 148 continues to supply the same current and therefore the voltage drop across resistor 138 is the same as before, the identical DC relationship between the three chroma demodulators is retained that existed when pin 108 was at a low potential.

When pin 108 is at a high potential, during blanking, the emitter electrode of transistor 184 clamps the voltage at the outputs of demodulators. This is required to prevent the demodulators from becoming saturated. If the demodulators would become saturated, proper circuit operation would be inhibited.

What has been described, therefore, is an improved chroma demodulator circuit, which is suitable for manufacture in integrated circuit form. Some of the significant advantages of the demodulator circuit of the embodiment of the invention have been illustrated.

In summary, DC stability has been achieved by the regulation of the power supply voltage. Therefore, a change in supply voltage does not induce a change in the voltage at the output of the demodulators of the chroma demodulator circuit. Furthemore, the differential voltage at the output of the demodulators is set by adjusting the plurality of potentiometers. Since the voltage on these potentiometers depends on the regulated supply voltage, the differential voltages also do not change with supply. The output voltages of the demodulators have been made independent of temperature by choosing a combination of diodes for developing a zero temperature coefficient voltage at the output of the DC bias network. Moreover, the potentiometers allow the independent adjustment of the DC level at each of the demodulators to allow the background adjustment to be made with unitized cathode ray tube structures. Lastly, a blanking amplifier structure has been disclosed which allows the demodulators to be readily adapted to AC coupled, DC restored systems at the video outputs. This has been achieved by developing well defined blanking pulses at the output of each of the demodulators. DC restoring can then be achieved by clamping these well defined pulses to the same DC level in the video output stages. Because the three pulses are of the same amplitude, the relationship between the DC voltage that they are clamped to and the chromiance signal is the same for each demodulator.

While the above detailed description has shown, described and pointed out the fundamental novel features of the invention as applied to the embodiment of the invention, it will be understood that various omissions, substitutions and changes in the form and detail of the circuits and method illustrated may be made by those skilled in the art without departing from the spirit of the invention. It is the intention, therefore, to be limited only as indicated by the scope of the following claims.

I claim:

1. A direct current (DC) biasing circuit for a chroma demodulator circuit which includes a plurality of demodulators for demodulating a chrominance input signal to supply color signals in a television receiver, the DC biasing circuit comprising:
   means adapted to receive a power supply voltage for providing a regulated voltage which is independent of variations in the magnitude of said power supply voltage, said regulated voltage having a zero temperature coefficient, said means for providing a regulating voltage including turn-around circuit means having an output terminal;
   amplifier means coupled between an output of said means for providing a regulated voltage and said output terminal of said turn-around circuit means for providing an output signal between first and second output terminals thereof, said output signal having a zero differential temperature coefficient; and
   first circuit means coupled to said first and second output terminals of said amplifier means for providing a plurality of output control signals at respective output terminals, said output control signals having amplitudes which are independently adjustable, said output control signals being independent of temperature variations and being coupled to respective ones of the plurality of demodulators so that the direct current (DC) output level of the demodulators can be varied as said amplitudes of said output control signals from said circuit means are varied to adjust the background of the television color image without effecting the gain of the demodulators.

2. The DC biasing circuit of claim 1, wherein said voltage regulator means includes in combination:
   an input terminal adapted to receive said power supply voltage;
   first electron control means having first and second electrodes, said second electrode being coupled to said input terminal;
   second electron control means having a first and second electrode, said second electrode being connected to said first electrode of said first electron control means;
   third electron control means having a first and second electrode, said second electrode being connected to said first electrode of said second electron control means;
   fourth electron control means having a first and second electrode, said second electrode being connected to a reference terminal of the DC biasing circuit, and said first electrode being connected to said first electrode of said third electron control means;
   said turn-around circuit means having a first, a second and a third input terminal, said first input terminal connected to said second electrode of said first electron control means, said second and said third input terminals connected to said power supply; and
   said voltage regulator means having a first and second output terminal thereof, said first output terminal connected to said second electrode of said second electron control means and said second output terminal connected to said first electrode of said fourth electron control means, said first output terminal being said output terminal.

3. The DC biasing circuit of claim 2 wherein:
   said first electron control means includes a first diode of a first conductivity type;
   said second electron control means includes a second diode also of said first conductivity type;
   said third electron control means includes a third diode of said first conductivity type; and
   said fourth electron control means includes a zener diode.

4. The DC biasing circuit of claim 2 wherein said turn-around circuit means includes a PNP turn-around circuit.

5. The DC biasing circuit of claim 1 wherein said amplifier means includes in combination:
   fifth electron control means having first and second electrodes and a control electrode, said second electrode being connected to said reference terminal of said chroma demodulator circuit;
   second circuit means connected between said first output terminal of said voltage regulator means and said control electrode of said fifth electron control means;
   sixth electron control means having a first and second electrode and a control electrode, said second electrode being connected to said reference terminal of the DC biasing circuit, and said control electrode being connected to said first electrode of said fifth electron control means;

third circuit means having first and second leads, said first lead being connected to said output terminal of said turn-around circuit means of said voltage regulator means and said second lead being connected to said first electrode of said sixth electron control means;

seventh electron control means having first and second electrodes and a control electrode, said control electrode being connected to said first lead of said second circuit means, said second electrode being coupled to said power supply voltage and said first electrode being connected to said first output terminal of said amplifier means;

fourth circuit means having first and second leads, said first lead being connected to said second lead of second circuit means;

eighth electron control means having a first and a second electrode and a control electrode, said first electrode connected to said second output terminal of said amplifier means, said control electrode being connected to said second lead of said fourth circuit means, and said second electrode being connected to said second electrode of said seventh electron control means.

6. The DC biasing circuit of claim 5 wherein:
said fifth electron control means includes a first bipolar transistor of a first conductivity type;
said sixth electron control means includes a second transistor also of said first conductivity type;
said seventh electron control means includes a third bipolar transistor of a second conductivity type; and
said eigth electron control means includes a fourth bipolar transistor also of said second conductivity type.

7. The DC biasing circuit of claim 5 including blanking means coupled to said amplifier means for providing identical reference pulses at each of said outputs of the demodulators to blank said color television image during horizontal and vertical retrace intervals, said blanking means being responsive to a blanking signal supplied to an input terminal thereof.

8. The DC biasing circuit of claim 7 wherein said blanking means includes in combination:
a first input terminal adapted to receive said blanking input signal;
ninth electron control means having a first electrode, a second electrode and a control electrode, said control electrode being coupled to said first input terminal, said first electrode being connected to said reference terminal of the DC biasing circuit and said second electrode being coupled to said second lead of said third circuit means of said amplifier means;
tenth electron control means having a first electrode, a second electrode and a control electrode, said first electrode being connected to said second electrode of said ninth electron control means, and said second electrode being connected to said power supply; and
fifth circuit means connected between said control electrode of said tenth electron control means and said second output terminal of said voltage regulator means, said fifth circuit means having first and second terminals, said first terminal being connected to said power supply voltage and said second terminal being connected to said reference terminal.

9. A direct current (DC) biasing network suitable to be provided in monolithic integrated circuit form for producing output control signals to a plurality of variable resistive devices, the variable resistive devices having output terminals coupled respectively to the outputs of a plurality of monolithic chroma demodulators which produce television image signals, the DC biasing circuit comprising:

means adapted to receive a power supply voltage for providing a regulated voltage which is independent of variations in the magnitude of said power supply voltage, said regulated voltage having zero temperature coefficient, said means for providing a regulated voltage including turn-around circuit means having an output terminal;

amplifier means coupled between an output of said means for providing a regulated voltage and said output terminal of said turn-around circuit means for providing an output control signal between first and second output terminals thereof, said output control signal being applied across the variable resistive devices and having a zero differential temperature coefficient such that the magnitudes of resultant signals produced at the respective output terminals of the plurality of variable resistive devices are independently adjustable and substantially independent of temperature variations so that the DC output levels of the plurality of demodulators are adjusted as said magnitudes of said resultant signals are adjusted to cause the background of the television image signals to be adjusted; and blanking means coupled to said amplifier means for providing identical reference pulses at each of said outputs of the plurality of demodulators to facilitate DC restoring thereat, said blanking means being responsive to a blanking signal applied at an input terminal thereof.

10. The DC biasing circuit of claim 9 wherein said voltage regulator means includes in combination:
first electron control means having first and second electrodes, said second electrode being coupled to said power supply voltage;
second electron control means having first and second electrodes, said second electrode being connected to said first electrode of said first electron control means and to said output terminal of said voltage regulator means;
third electron control means having first and second electrodes, said first electrode being connected to said first electrode of said second electron control means and said second electrode being connected to a reference terminal of said DC biasing circuit; and
said turn-around circuit means having first, second and third input terminals, said first input terminal being connected to said second electrode of said first electron control means, said second and third input terminals being connected to said power supply voltage, said turn-around circuit means being responsive to said regulated voltage for supplying a driving current at said output terminal.

11. The DC biasing circuit of claim 10 wherein:
said third electron control means includes a zener diode; and said turn-around circuit means includes a PNP turn-around circuit.

12. The DC biasing circuit of claim 10 wherein said amplifier means further includes;
fourth electron control means having first and second electrodes and a control electrode, said control electrode being coupled to said first electrode of said first electron control means and said second electrode being connected to said reference terminal of said chroma demodulator circuit;
first circuit means having first and second leads, said first lead being connected to said output terminal of said turn-around circuit means and said second lead being connected to said first electrode of said fourth electron control means;
fifth electron control means having first and second electrodes and a control electrode, said control electrode being connected to said output terminal of said turn-around circuit means, said second electrode being coupled to said power supply voltage and said first electrode being adapted to be connected to said first output terminal of said amplifier means;
sixth electron control means having first and second electrodes and a control electrode, said first electrode being adapted to be connected to said second output terminal of said amplifier means, and said second electrode being connected to said second electrode of said fifth electron control means; and
second circuit means connected between said first electrode of said fourth electron control means and said control electrode of said sixth electron control means.

13. The DC biasing circuit of claim 12 wherein:
said fourth electron control means includes a pair of bipolar transistors of a first conductivity type;
said fifth electron control means includes a bipolar transistor of a second conductivity type; and
said sixth electron control means includes a bipolar transistor of a second conductivity type.

14. The DC biasing circuit of claim 12 wherein said blanking means includes in combination:
seventh electron control means having first and second electrodes and a control electrode, said first electrode being connected to said reference terminal of said demodulator circuit, said second electrode being coupled to said second lead of said first circuit means, said control electrode being connected to said input terminal of said blanking means to receive said blanking input signal;
eighth electron control means having first and second electrodes and a control electrode, said first electrode being coupled to said second electrode of said seventh electron control means, said second electrode being connected to said power supply voltage; and
third circuit means connected between said control electrode of said eighth electron control means and said first electrode of said third electron control means.

* * * * *